United States Patent
Kawano (10) Patent No.: US 11,867,170 B2
(45) Date of Patent: Jan. 9, 2024

(54) DECOMPRESSION SYSTEM AND DECOMPRESSION METHOD

(71) Applicant: HONDA MOTOR CO., LTD., Tokyo (JP)

(72) Inventor: Takumi Kawano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/847,320

(22) Filed: Jun. 23, 2022

(65) Prior Publication Data

US 2022/0412342 A1    Dec. 29, 2022

(30) Foreign Application Priority Data

Jun. 28, 2021  (JP) ................................ 2021-106843

(51) Int. Cl.
*F04B 49/03* (2006.01)
*F04B 49/22* (2006.01)
*F04B 49/06* (2006.01)

(52) U.S. Cl.
CPC ............ *F04B 49/03* (2013.01); *F04B 49/065* (2013.01); *F04B 49/22* (2013.01); *F04B 2205/05* (2013.01); *F04B 2205/11* (2013.01); *F04B 2207/03* (2013.01)

(58) Field of Classification Search
CPC ...................... F04B 49/03–035; F04B 49/065; F04B 49/08; F04B 49/10; F04B 49/22–225; F04B 2205/04–05; F04B 2205/11–112; F04B 2207/03
USPC .................................................. 417/292, 307
See application file for complete search history.

(56) References Cited

U.S. PATENT DOCUMENTS

| | | | | |
|---|---|---|---|---|
| 5,054,995 A | * | 10/1991 | Haseley | F04B 49/065 340/3.53 |
| 6,082,971 A | * | 7/2000 | Gunn | F04C 28/08 417/32 |
| 6,273,686 B1 | * | 8/2001 | Kroell | G05D 16/2066 137/115.18 |
| 6,283,716 B1 | * | 9/2001 | Centers | F04B 49/10 417/18 |
| 2003/0077179 A1 | * | 4/2003 | Collins | F04C 28/28 417/63 |

(Continued)

FOREIGN PATENT DOCUMENTS

| | | | |
|---|---|---|---|
| CN | 204663896 U | * | 9/2015 |
| CN | 106286254 A | * | 1/2017 |

(Continued)

OTHER PUBLICATIONS

Office Action dated Feb. 21, 2023 issued over the corresponding Japanese Patent Application No. 2021-106843 with the English translation thereof.

(Continued)

*Primary Examiner* — Alexander B Comley
(74) *Attorney, Agent, or Firm* — Carrier, Shende & Associates P.C.; Joseph P. Carrier; Jeffrey T. Gedeon (57) ABSTRACT

A decompression system is configured to: determine a regulating amount of a flow regulating valve provided on a discharge flow path through which compressed gas flowing out from a gas generating device flows, the regulating amount being determined based on a pressure detected by a pressure sensor provided on the discharge flow path; correct the determined regulating amount based on a temperature detected by a temperature sensor provided on the discharge flow path; and control the flow regulating valve so that the regulating amount thereof becomes the corrected regulating amount.

6 Claims, 5 Drawing Sheets

(56) References Cited

U.S. PATENT DOCUMENTS

| | | | |
|---|---|---|---|
| 2006/0127224 A1* | 6/2006 | Sweet | F04B 49/065 417/32 |
| 2010/0166571 A1* | 7/2010 | Van Den Wyngaert | F04C 28/26 417/279 |
| 2015/0153005 A1* | 6/2015 | Takano | F17C 5/007 141/227 |
| 2018/0163883 A1 | 6/2018 | Ieki | |
| 2020/0263681 A1* | 8/2020 | Hoff | F04B 35/002 |
| 2020/0332425 A1 | 10/2020 | Kurashina et al. | |

FOREIGN PATENT DOCUMENTS

| | | | | |
|---|---|---|---|---|
| CN | 108317073 A | * | 7/2018 | F04B 49/065 |
| CN | 108799073 A | * | 11/2018 | |
| CN | 109058088 A | * | 12/2018 | F04B 49/065 |
| JP | H09-171413 A | | 6/1997 | |
| JP | 2007-026056 A | | 2/2007 | |
| JP | 4171391 B | | 10/2008 | |
| JP | 2011-134164 A | | 7/2011 | |
| JP | 2016-535215 A | | 11/2016 | |
| JP | 2018-096443 A | | 6/2018 | |
| JP | 2020-176309 A | | 10/2020 | |
| JP | 2021-060203 A | | 4/2021 | |
| WO | 2015/026621 A2 | | 2/2015 | |

OTHER PUBLICATIONS

Office Action dated Jun. 13, 2023 issued in the corresponding Japanese Patent Application No. 2021-106843 with the English translation thereof.

* cited by examiner

DECOMPRESSION SYSTEM AND DECOMPRESSION METHOD

CROSS-REFERENCE TO RELATED APPLICATIONS

This application is based upon and claims the benefit of priority from Japanese Patent Application No. 2021-106843 filed on Jun. 28, 2021, the contents of which are incorporated herein by reference.

BACKGROUND OF THE INVENTION

Field of the Invention

The present invention relates to a decompression system and a decompression method for decompressing compressed gas generated by a gas generating device that generates compressed gas.

Description of the Related Art

Examples of the gas generating device include a hydrogen compressor, an oxygen compressor, a hydrogen booster, and the like. The hydrogen compressor electrolyzes water and compresses the generated hydrogen gas. The oxygen compressor electrolyzes water and compresses the generated oxygen gas. The hydrogen booster electrolyzes hydrogen gas to generate high-pressure hydrogen gas.

In the gas generating device, it is necessary to release the pressure difference between both sides of an electrolyte membrane when the operation is stopped. Specifically, the pressure difference between both sides of the electrolyte membrane is released by controlling a flow regulating valve provided on a discharge flow path connected to the gas generating device, so as to reduce the pressure of the compressed gas on the discharge flow path.

JP 2011-134164 A discloses a control method for controlling the opening degree of a valve. In this control method, a pressure drop curve in the chamber is actually measured, and the pressure drop curve is changed so that the actually measured pressure drop curve approximates a target pressure drop gradient. In the control method, the opening degree of the valve is controlled based on the pressure drop curve thus changed.

SUMMARY OF THE INVENTION

Incidentally, the temperature of the compressed gas generated by the gas generating device tends to change depending on the heat generated by the gas generating device, the outside air temperature, or the like. When the temperature of the compressed gas generated by the gas generating device changes, the volume, pressure, viscosity, or the like of the compressed gas changes. In order to change the pressure in accordance with a target pressure change rate, it is necessary to change the regulating amount of a flow regulating valve in accordance with the change in temperature.

Therefore, even if the control method of JP 2011-134164 A is applied to the gas generating device, there is a concern that the flow rate of the compressed gas may not be appropriately regulated.

An object of the present invention is to solve the aforementioned problem.

According to an aspect of the present invention, there is provided a decompression system that decompresses compressed gas generated by a gas generating device configured to generate the compressed gas, the decompression system comprising: a flow regulating valve provided on a discharge flow path through which the compressed gas flowing out from the gas generating device flows, the flow regulating valve being configured to regulate a flow rate of the compressed gas; a temperature sensor provided on the discharge flow path and configured to detect a temperature of the compressed gas; a pressure sensor provided on the discharge flow path and configured to detect a pressure of the compressed gas; and a control device configured to control the flow regulating valve, wherein the control device determines a regulating amount of the flow regulating valve based on the pressure detected by the pressure sensor, and corrects the determined regulating amount based on the temperature detected by the temperature sensor.

According to another aspect of the present invention, there is provided a decompression method for decompressing compressed gas generated by a gas generating device configured to generate the compressed gas, the decompression method comprising: determining a regulating amount of a flow regulating valve provided on a discharge flow path through which the compressed gas flowing out from the gas generating device flows, the regulating amount being determined based on a pressure detected by a pressure sensor provided on the discharge flow path; correcting the determined regulating amount based on a temperature detected by a temperature sensor provided on the discharge flow path; and controlling the flow regulating valve in a manner so that the regulating amount thereof becomes the corrected regulating amount.

In the above-described decompression system and decompression method, the regulating amount of the flow regulating valve as determined based on the pressure of the compressed gas is corrected based on the temperature of the compressed gas, whereby it is possible to more appropriately regulate the flow rate than in a case where the regulating amount is not corrected.

The above and other objects features and advantages of the present invention will become more apparent from the following description when taken in conjunction with the accompanying drawings in which a preferred embodiment of the present invention is shown by way of illustrative example.

DESCRIPTION OF THE INVENTION

Figure 1:
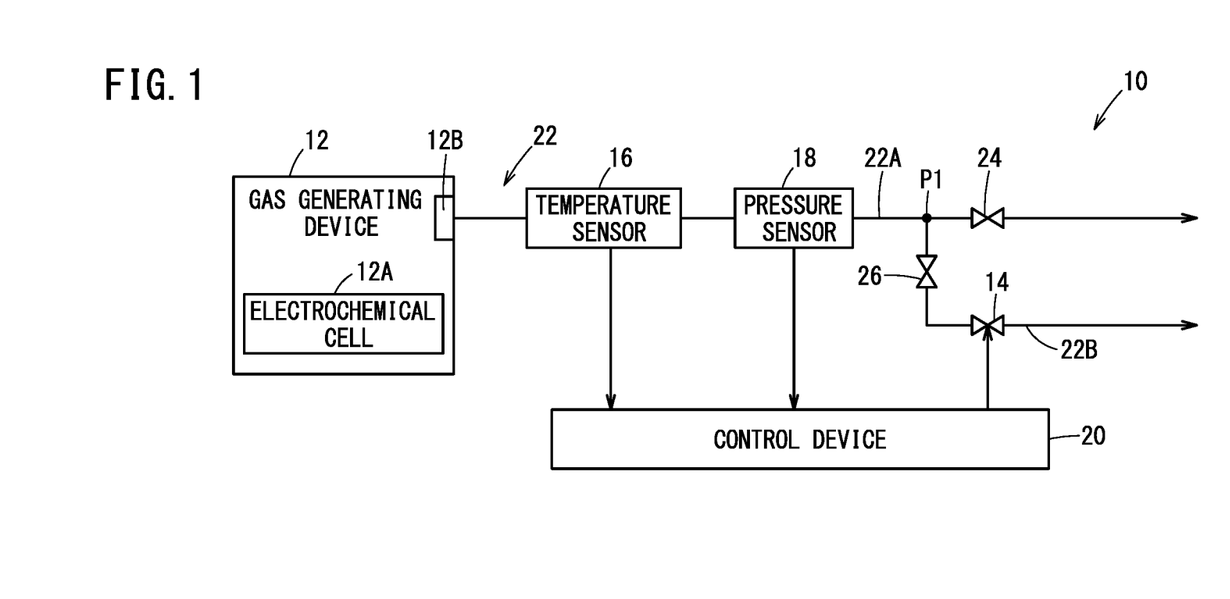
FIG. 1 is a schematic diagram showing a decompression system according to an embodiment.

FIG. 1 is a schematic diagram showing a decompression system 10 according to an embodiment. The decompression system 10 is a system that decompresses compressed gas generated by a gas generating device 12. The decompression system 10 includes a flow regulating valve 14, a temperature sensor 16, a pressure sensor 18, and a control device 20.

The gas generating device 12 may be a hydrogen booster, a hydrogen compressor, or an oxygen compressor. The gas generating device 12 includes an electrochemical cell 12A.

The electrochemical cell 12A includes an electrolyte membrane, an anode stacked on one surface of the electrolyte membrane, and a cathode stacked on the other surface of the electrolyte membrane. A voltage is applied between the anode and the cathode.

When the gas generating device 12 is a hydrogen booster, hydrogen gas is supplied to the anode of the electrochemical cell 12A. When a voltage is applied between the anode and the cathode, the hydrogen gas supplied to the anode is electrolyzed to generate protons ($H^+$ ions). The electrochemical cell 12A transports protons from the anode to the cathode through the electrolyte membrane, and generates compressed gas from the transported protons.

When the gas generating device 12 is a hydrogen compressor, water is supplied to the anode of the electrochemical cell 12A. When a voltage is applied between the anode and the cathode, the water supplied to the anode is electrolyzed to generate protons ($H^+$ ions). The electrochemical cell 12A transports protons from the anode to the cathode through the electrolyte membrane, and generates compressed gas from the transported protons.

When the gas generating device 12 is an oxygen compressor, water is supplied to the cathode of the electrochemical cell 12A. When a voltage is applied between the anode and the cathode, the water supplied to the cathode is electrolyzed to generate $OH^-$. The electrochemical cell 12A transports $OH^-$ from the cathode to the anode through the electrolyte membrane, and generates compressed gas (high-pressure oxygen gas) from the transported $OH^-$.

A discharge flow path 22 is connected to a discharge port 12B of the gas generating device 12. Compressed gas flowing out from the gas generating device 12 flows through the discharge flow path 22. The discharge flow path 22 may be a pipe. The discharge flow path 22 includes a first discharge flow path 22A and a second discharge flow path 22B. The second discharge flow path 22B branches off from a branch portion P1 of the first discharge flow path 22A. The compressed gas flowing through the first discharge flow path 22A flows into a pressure accumulator. The compressed gas flowing through the second discharge flow path 22B is discharged.

A back pressure valve 24 is provided on the first discharge flow path 22A, on the downstream side of the branch portion P1. An on-off valve 26 is provided on the second discharge flow path 22B. The flow regulating valve 14 is provided on the second discharge flow path 22B, on the downstream side of the on-off valve 26.

The flow regulating valve 14 is a valve that regulates the flow rate of the compressed gas. The flow regulating valve 14 may be an opening adjustable regulating valve whose opening degree is variable. Further, the flow regulating valve 14 may be an on-off regulating valve whose ratio (duty ratio) between a valve opening period and a valve closing period per unit time is variable. The flow regulating valve 14 varies the opening degree or the duty ratio thereof under the control of the control device 20.

The temperature sensor 16 is a sensor for detecting the temperature of the compressed gas. The temperature sensor 16 is provided on the discharge flow path 22, on the upstream side of the flow regulating valve 14. In FIG. 1, the temperature sensor 16 is provided on the discharge flow path 22 and between the gas generating device 12 and the on-off valve 26.

The pressure sensor 18 is a sensor for detecting the pressure of the compressed gas. The pressure sensor 18 is provided on the discharge flow path 22, on the upstream side of the flow regulating valve 14. In FIG. 1, the pressure sensor 18 is provided on the discharge flow path 22 and between the gas generating device 12 and the on-off valve 26.

The control device 20 is a device that controls the on-off valve 26 and the flow regulating valve 14. When the pressure of the compressed gas is not reduced, the control device 20 closes the on-off valve 26. In this case, the control device 20 does not control the flow regulating valve 14. When the on-off valve 26 is closed, the pressure of the compressed gas upstream of the back pressure valve 24 is adjusted to be constant by the back pressure valve 24. On the other hand, when the pressure of the compressed gas is reduced, the control device 20 opens the on-off valve 26. In this case, the control device 20 reduces the pressure of the compressed gas upstream of the flow regulating valve 14 by controlling the flow regulating valve 14.

Figure 2:
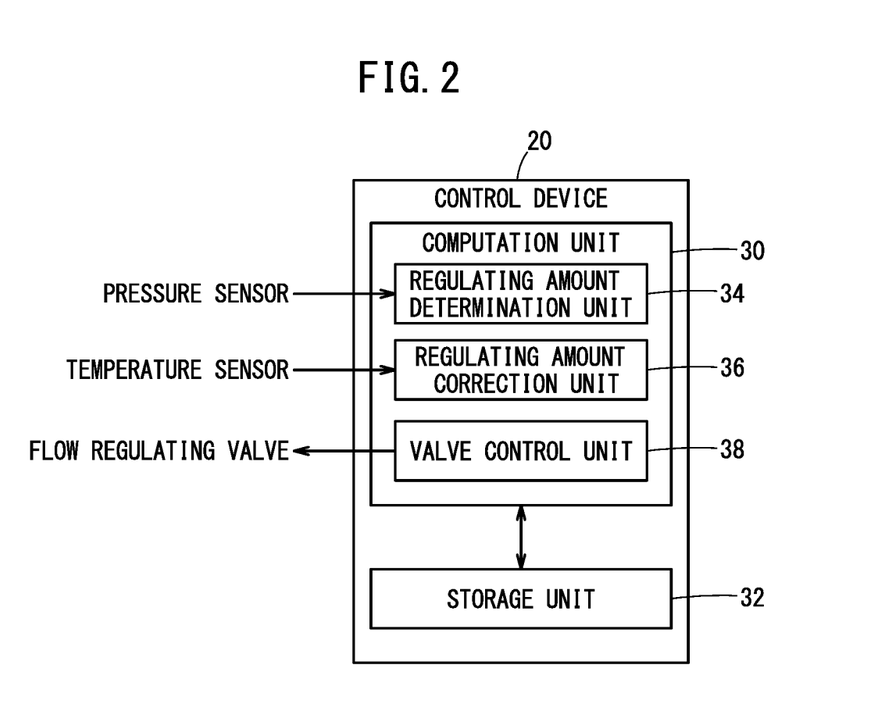
FIG. 2 is a block diagram showing the configuration of a control device.

FIG. 2 is a block diagram showing the configuration of the control device 20. The control device 20 includes a computation unit 30 and a storage unit 32. The computation unit 30 includes a regulating amount determination unit 34, a regulating amount correction unit 36, and a valve control unit 38. The storage unit 32 includes a volatile memory such as a RAM, and a nonvolatile memory such as a ROM.

At least a part of the regulating amount determination unit 34, a part of the regulating amount correction unit 36, and a part of the valve control unit 38 may be an integrated circuit such as an ASIC. Further, at least a part of the regulating amount determination unit 34, a part of the regulating amount correction unit 36, and a part of the valve control unit 38 may be functional units that function when a processor executes programs stored in the storage unit 32.

The regulating amount determination unit 34 determines a regulating amount of the flow regulating valve 14 based on the pressure detected by the pressure sensor 18. Further, the regulating amount determination unit 34 determines the regulating amount of the flow regulating valve 14 for each unit time.

When the flow regulating valve 14 is an opening adjustable regulating valve, the regulating amount of the flow regulating valve 14 is an opening degree thereof. When the flow regulating valve 14 is an on-off regulating valve, the regulating amount of the flow regulating valve 14 is a duty ratio.

Based on the temperature detected by the temperature sensor 16 and the number of times of decompression, the regulating amount correction unit 36 corrects the regulating amount determined by the regulating amount determination unit 34. The number of times of decompression is the number of times wherein performing processing from the start of control of the flow regulating valve 14 to the end of the control thereof is defined as performing the decompression one time.

Figure 3:
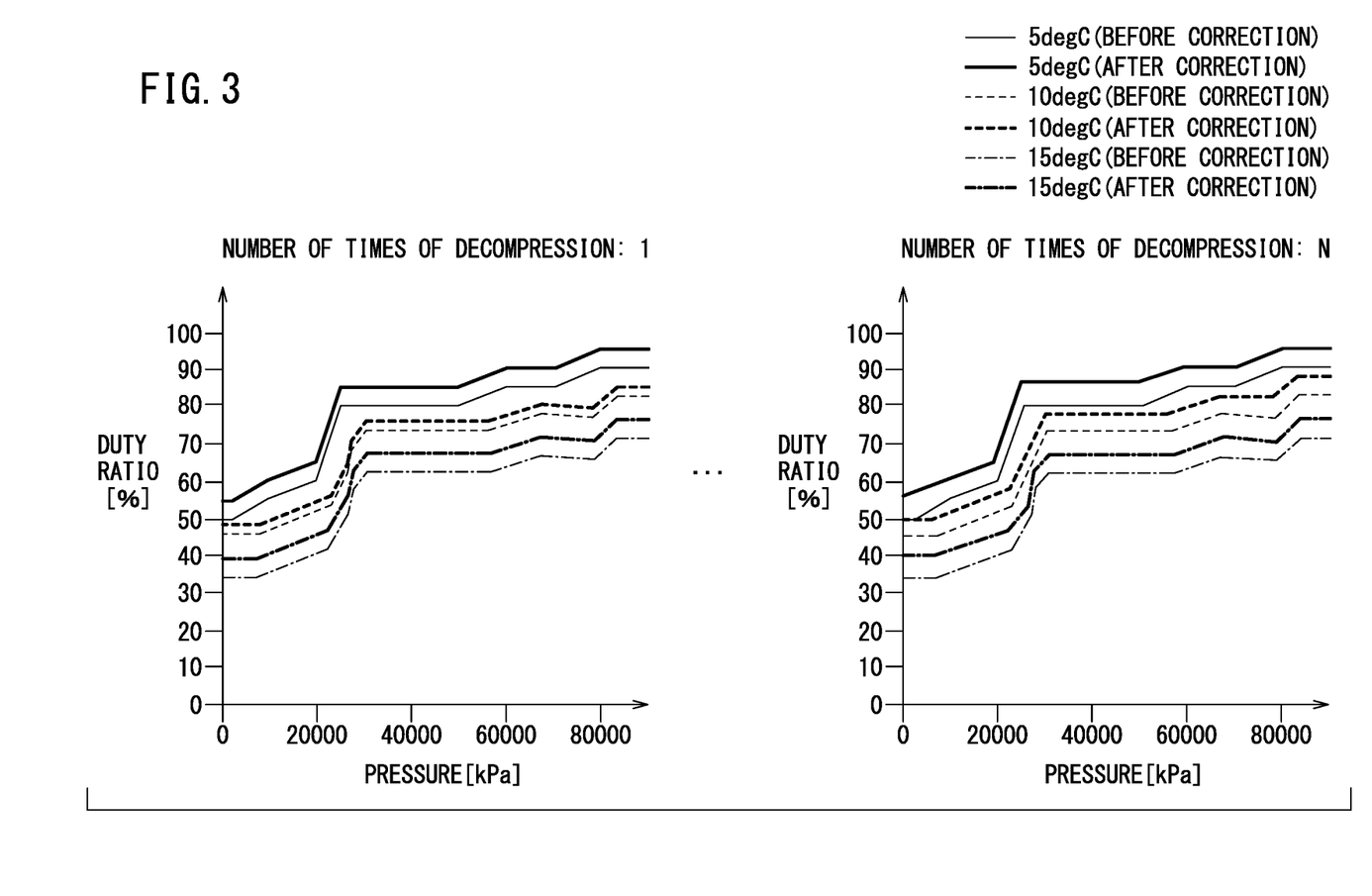
FIG. 3 is a graph illustrating a relationship between the temperature and the number of times of decompression, and the regulating amount.

Here, the relationship between the temperature and the number of times of decompression, and the regulating amount will be described. FIG. 3 is a graph illustrating the relationship between the temperature and the number of times of decompression, and the regulating amount. In FIG. 3, a plurality of correlation graphs corresponding to the number of times of decompression are illustrated. The correlation graph on the left side of FIG. 3 corresponds to a case where the number of times of decompression is one. On the other hand, the correlation graph on the right side of FIG.

3 corresponds to a case where the number of times of decompression is N. "N" is an integer greater than or equal to 2.

Each correlation graph has correlation lines corresponding to a plurality of temperatures. In each graph of FIG. 3, a correlation line corresponding to 5 degree Celsius, a correlation line corresponding to 10 degree Celsius, and a correlation line corresponding to 15 degree Celsius are illustrated. Each correlation line is a line connecting plots indicating a correlation between the pressure and the regulating amount of the flow regulating valve 14.

In FIG. 3, a duty ratio is illustrated as the regulating amount of the flow regulating valve 14. When the duty ratio is 100%, it means that there is no valve closing period per unit time. In this case, the flow rate of the flow regulating valve 14 becomes maximum. On the other hand, when the duty ratio is 0%, it means that there is no valve opening period per unit time. In this case, the flow rate of the flow regulating valve 14 becomes 0.

The pressure and volume of the compressed gas present in a container equipped with the back pressure valve 24 become constant. Thus, as the temperature of the compressed gas increases, the amount of substance of the compressed gas present in the container decreases. Therefore, in a case where the regulating amount at a first temperature is the same as the regulating amount at a second temperature that is higher than the first temperature, the rate of decrease in the pressure increases with an increase in the temperature of the compressed gas. Therefore, if the regulating amount is corrected so that the flow rate decreases as the temperature increases, the change rate of the pressure due to an increase in the temperature of the compressed gas is suppressed.

In addition, when the flow regulating valve 14 comes into contact with the seat of the valve at the time of closing and the flow regulating valve 14 or the seat is worn, the flow cross-sectional area increases. Therefore, when the temperature of the compressed gas does not change, the flow rate of the flow regulating valve 14 tends to increase in accordance with an increase in the number of times of decompression. Therefore, if the regulating amount is corrected so that the flow rate decreases as the number of times of decompression increases, a change in the flow rate due to an increase in the number of times of decompression is suppressed.

Therefore, the regulating amount correction unit 36 corrects the regulating amount determined by the regulating amount determination unit 34, so that the flow rate decreases as the temperature detected by the temperature sensor 16 increases. Further, the regulating amount correction unit 36 corrects the regulating amount determined by the regulating amount determination unit 34, so that the flow rate decreases as the number of times of decompression increases.

The valve control unit 38 controls the on-off valve 26 and the flow regulating valve 14. When closing the on-off valve 26, the valve control unit 38 does not control the flow regulating valve 14. On the other hand, when opening the on-off valve 26, the valve control unit 38 controls the flow regulating valve 14 so that the regulating amount thereof becomes the regulating amount corrected by the regulating amount correction unit 36.

When the flow regulating valve 14 is an opening adjustable regulating valve, for example, the valve control unit 38 generates a drive signal for driving a motor of the flow regulating valve 14 based on the regulating amount (opening degree) corrected by the regulating amount correction unit 36. By outputting the generated drive signal to the motor of the flow regulating valve 14, the valve control unit 38 changes the opening degree of the flow regulating valve 14 to the opening degree corrected by the regulating amount correction unit 36.

When the flow regulating valve 14 is an on-off regulating valve, for example, the valve control unit 38 generates a pulse signal for driving a solenoid of the flow regulating valve 14 based on the regulating amount (duty ratio) corrected by the regulating amount correction unit 36. By outputting the generated pulse signal to the solenoid of the flow regulating valve 14, the valve control unit 38 changes the ratio (duty ratio) between the valve opening period and the valve closing period per unit time.

Figure 4:
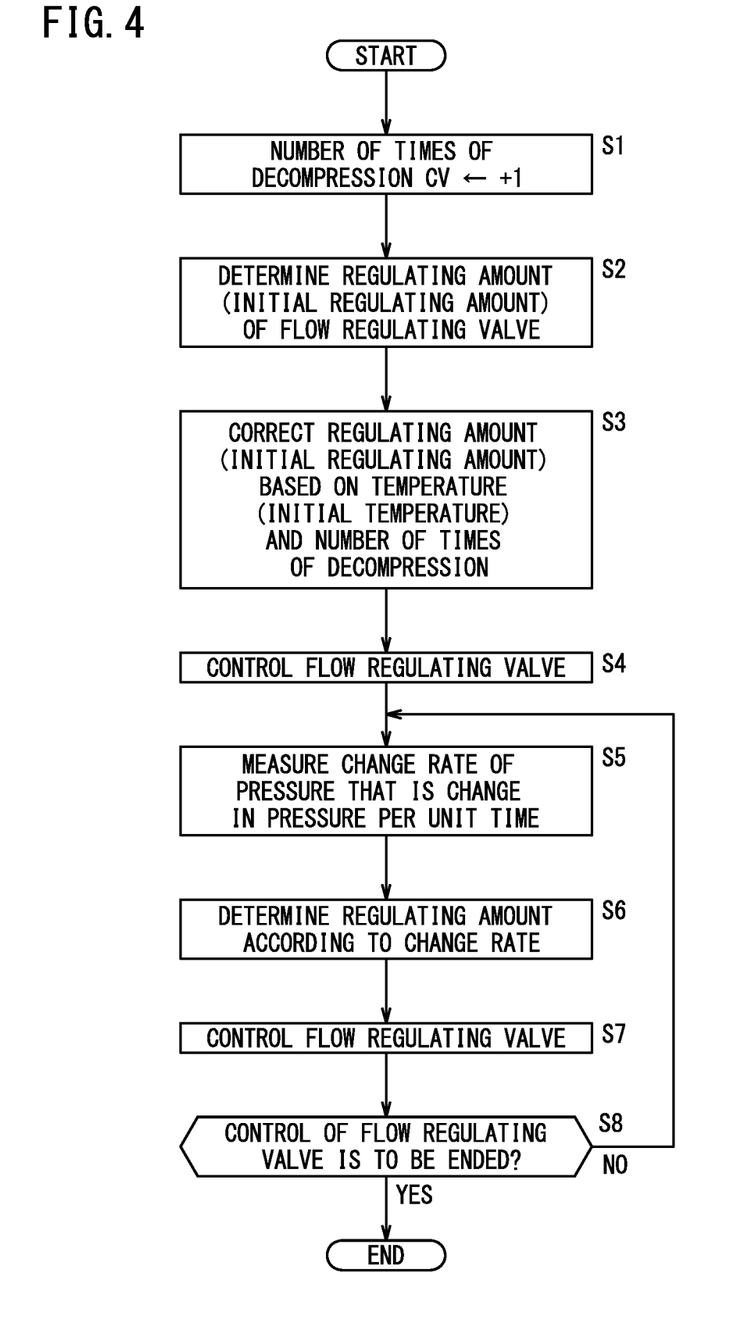
FIG. 4 is a flowchart showing a procedure of a control process of the control device.

Next, a decompression method for decompressing the compressed gas generated by the gas generating device 12 will be described. This decompression method is achieved by a control process of the control device 20 that controls the flow regulating valve 14. FIG. 4 is a flowchart showing a procedure of the control process of the control device 20.

For example, the control device 20 starts the control process when receiving a decompression command output from the outside. In this case, the valve control unit 38 opens the on-off valve 26 that is in the closed state. When the on-off valve 26 is opened, the control process proceeds to step S1.

In step S1, the computation unit 30 increments a count value CV of the number of times of decompression by "1". When the count value CV of the number of times of decompression is incremented, the control process proceeds to step S2.

In step S2, the regulating amount determination unit 34 determines a regulating amount (initial regulating amount) of the flow regulating valve 14 from a pressure (initial pressure) detected by the pressure sensor 18 at the start of control of the flow regulating valve 14.

Note that a database or relational expression stored in the storage unit 32 may be used to determine the regulating amount (initial regulating amount). The database is information, such as the graph illustrated in FIG. 3, indicating a correlation between the pressure and the regulating amount. The relational expression is a mathematical expression for deriving a regulating amount correlated with the pressure.

When the database is used, the regulating amount determination unit 34 searches for a regulating amount that most approximately correlates to the initial pressure, and determines the searched regulating amount as the initial regulating amount of the flow regulating valve 14. When the relational expression is used, the regulating amount determination unit 34 calculates the regulating amount from the initial pressure and determines the calculated regulating amount as the initial regulating amount of the flow regulating valve 14. When the initial regulating amount of the flow regulating valve 14 is determined, the control process proceeds to step S3.

In step S3, the regulating amount correction unit 36 acquires a temperature (initial temperature) detected by the temperature sensor 16 at the start of control of the flow regulating valve 14. Further, the regulating amount correction unit 36 corrects the regulating amount (initial regulating amount) determined in step S2. Here, the regulating amount correction unit 36 corrects the regulating amount so that the flow rate decreases as the acquired temperature (initial temperature) increases. In addition, the regulating amount correction unit 36 corrects the regulating amount so that the flow rate decreases as the acquired number of times of decompression (count value CV) increases. When the determined regulating amount (initial regulating amount) is corrected in step S3, the control process proceeds to step S4.

A correction database or correction relational expression stored in the storage unit 32 may be used to correct the regulating amount (initial regulating amount). The correction database is information indicating a correction amount corresponding to each of a plurality of patterns obtained by combining a plurality of temperatures and a plurality of numbers of times of decompression. The correction relational expression is a mathematical expression for deriving a correction amount correlated with the temperature.

In step S4, the valve control unit 38 controls the flow regulating valve 14 so that the regulating amount thereof becomes the regulating amount (initial regulating amount) corrected in step S3. When the flow regulating valve 14 is controlled, the control process proceeds to step S5.

In step S5, the regulating amount determination unit 34 starts measuring a change rate of the pressure that is a change in pressure per unit time, based on the pressure detected by the pressure sensor 18. When the change rate of the pressure is measured, the control process proceeds to step S6.

In step S6, the regulating amount determination unit 34 re-determines the regulating amount of the flow regulating valve 14 in accordance with the change rate measured in step S5.

For example, the regulating amount determination unit 34 may change the regulating amount of the flow regulating valve 14 determined in step S2, so as to reduce the difference between a target change rate and the change rate measured in step S5, and may re-determine the changed regulating amount as the regulating amount of the flow regulating valve 14. In addition, the regulating amount determination unit 34 may calculate a regulating amount corresponding to the measured change rate by using a relational expression indicating a relationship between the change rate and the regulating amount, and may re-determine the calculated regulating amount as the regulating amount of the flow regulating valve 14. In addition, the regulating amount determination unit 34 may search for a regulating amount that most approximately corresponds to the measured change rate by using a database indicating regulating amounts corresponding to a plurality of change rates, and may re-determine the searched regulating amount as the regulating amount of the flow regulating valve 14. When the regulating amount of the flow regulating valve 14 is determined, the control process proceeds to step S7.

In step S7, the valve control unit 38 controls the flow regulating valve 14 so that the regulating amount thereof becomes the regulating amount that has been re-determined in step S6. When the flow regulating valve 14 is controlled, the control process proceeds to step S8.

In step S8, the computation unit 30 determines whether or not to end the control of the flow regulating valve 14. Here, for example, when a decompression stop command that is output from the outside is not supplied, the computation unit 30 determines not to end the control of the flow regulating valve 14. In this case, the control process returns to step S5. On the other hand, when the decompression stop command is supplied, the computation unit 30 determines to end the control of the flow regulating valve 14. In this case, the control process ends.

In this way, according to the temperature and the number of times of decompression at the start of control, the control device 20 corrects the regulating amount of the flow regulating valve 14 that corresponds to the pressure at the start of control, and controls the flow regulating valve 14 so that the regulating amount thereof becomes the corrected regulating amount (S1 to S4).

Thereafter, the control device 20 executes feedback control until the control of the flow regulating valve 14 is ended (S5 to S8). That is, the control device 20 varies the regulating amount according to the change rate of the pressure for each unit time.

The above-described embodiment may be modified as follows.

Figure 5:
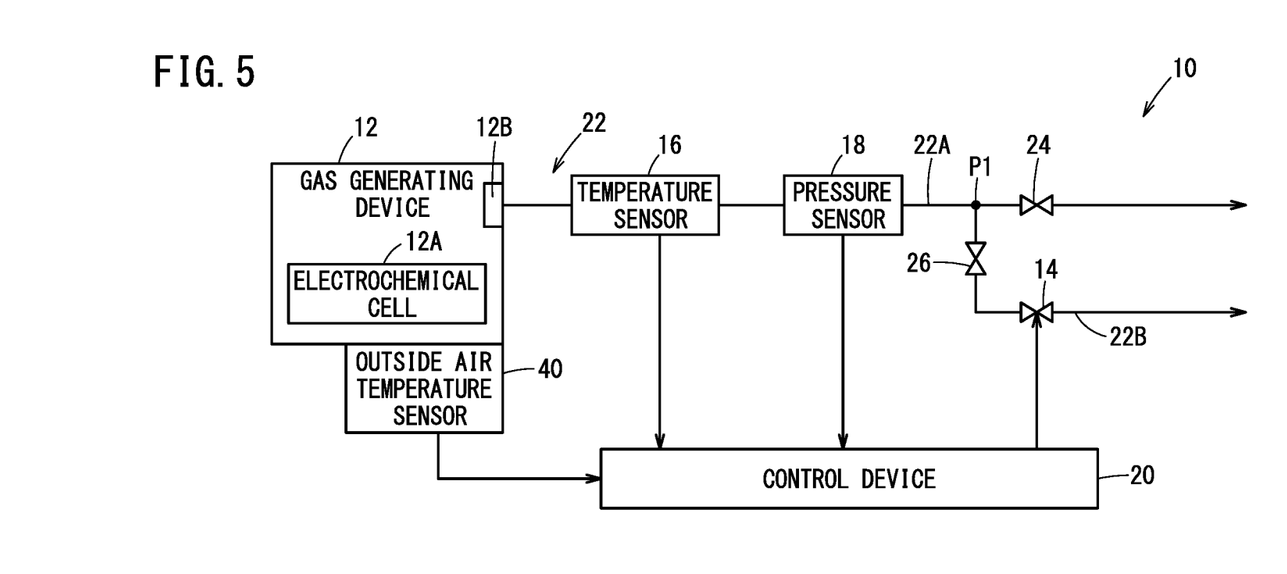
FIG. 5 is a schematic diagram showing a decompression system according to a modification.

FIG. 5 is a schematic diagram showing a decompression system 10 according to a modification. In the decompression system 10 of the modification, an outside air temperature sensor 40 is newly provided. The outside air temperature sensor 40 is a sensor that detects the outside air temperature of the gas generating device 12. The outside air temperature sensor 40 is attached to, for example, an outer wall surface of the gas generating device 12.

The regulating amount correction unit 36 of this modification estimates a temperature gradient of the compressed gas based on the temperature detected by the temperature sensor 16 at the start of control of the flow regulating valve 14 and the outside air temperature detected by the outside air temperature sensor 40 at the start of control of the flow regulating valve 14. This estimation is performed in step S2 of the control process shown in FIG. 4.

Further, in this modification, in step S2, the regulating amount correction unit 36 preferably corrects, in accordance with the estimated temperature gradient of the compressed gas, the regulating amount determined by the regulating amount determination unit 34.

As described above, in this modification, the control device 20 estimates the temperature gradient of the compressed gas based on the temperature of the compressed gas and the outside air temperature, and corrects the regulating amount of the flow regulating valve 14 based on the estimated temperature gradient. As a result, the control device 20 can regulate the flow rate of the flow regulating valve 14 in consideration of not only the temperature on the discharge flow path 22 but also the outside air temperature.

Note that the number of times of decompression in the embodiment and the modification may be omitted. That is, the control device 20 may correct the regulating amount based on only the temperature detected by the temperature sensor 16. When the control device 20 corrects the regulating amount based on only the temperature, step S1 of the control process shown in FIG. 4 is omitted.

As inventions that can be grasped from the above description, the following first and second inventions can be mentioned.

A first aspect of the present invention is a decompression system (10) that decompresses compressed gas generated by a gas generating device (12) configured to generate the compressed gas. The decompression system (10) includes a flow regulating valve (14) provided on a discharge flow path (22) through which the compressed gas flowing out from the gas generating device (12) flows, the flow regulating valve (14) being configured to regulate a flow rate of the compressed gas, a temperature sensor (16) provided on the discharge flow path (22) and configured to detect a temperature of the compressed gas, a pressure sensor (18) provided on the discharge flow path (22) and configured to detect a pressure of the compressed gas, and a control device (20) configured to control the flow regulating valve (14). The control device (20) determines a regulating amount of the flow regulating valve (14) based on the pressure detected by the pressure sensor (18), and corrects the determined regulating amount based on the temperature detected by the temperature sensor (16). As a result, the decompression system (10) can more appropriately regulate the flow rate of the flow regulating valve (14) than in a case where the regulating amount of the flow regulating valve (14) as determined based on the pressure of the compressed gas is not corrected based on the temperature of the compressed gas.

The control device (20) may measure a change rate of the pressure that is a change in the pressure per unit time, from a start of control of the flow regulating valve (14), and determine the regulating amount according to the measured change rate. As a result, the control device (20) can appropriately regulate the flow rate of the flow regulating valve (14) in accordance with the change rate of the pressure while taking the temperature into consideration.

The control device (20) may vary the regulating amount so as to reduce a difference between the change rate and a target change rate. As a result, the control device (20) can regulate the flow rate of the flow regulating valve (14) so as to follow the target change rate.

The decompression system (10) may further include an outside air temperature sensor (40) configured to detect an outside air temperature of the gas generating device (12), and the control device (20) may estimate a temperature gradient of the compressed gas based on the temperature detected by the temperature sensor (16) at the start of the control of the flow regulating valve (14) and the outside air temperature detected by the outside air temperature sensor (40) at the start of the control of the flow regulating valve (14), and correct the determined regulating amount based on the estimated temperature gradient. As a result, the control device (20) can regulate the flow rate of the flow regulating valve (14) in consideration of not only the temperature on the discharge flow path (22) but also the outside air temperature.

The control device (20) may correct the determined regulating amount according to the temperature at the start of the control of the flow regulating valve (14). This makes it possible to more appropriately regulate the flow rate of the flow regulating valve (14) than in a case where the regulating amount is corrected after the start of the control.

The control device (20) may correct the determined regulating amount in a manner so that the flow rate decreases as the temperature increases. As a result, the control device (20) can appropriately regulate the flow rate of the flow regulating valve (14) in consideration of the temperature.

The control device (20) may correct the determined regulating amount according to the temperature and a number of times of decompression wherein performing processing from the start of the control of the flow regulating valve (14) to an end of the control thereof is defined as performing the decompression one time. As a result, the control device (20) can improve the correction accuracy as compared with a case where the regulating amount is corrected based on only the amount of change in temperature.

The control device (20) may correct the determined regulating amount in a manner so that the flow rate decreases as the number of times of decompression increases. As a result, the control device (20) can appropriately regulate the flow rate of the flow regulating valve (14) in accordance with the change rate of the pressure while considering the number of times of decompression.

A second aspect of the present invention is a decompression method for decompressing compressed gas generated by a gas generating device (12) configured to generate the compressed gas. The decompression method includes: determining a regulating amount of a flow regulating valve (14) provided on a discharge flow path (22) through which the compressed gas flowing out from the gas generating device (12) flows, the regulating amount being determined based on a pressure detected by a pressure sensor (18) provided on the discharge flow path (22); correcting the determined regulating amount based on a temperature detected by a temperature sensor (16) provided on the discharge flow path (22); and controlling the flow regulating valve (14) in a manner so that the regulating amount thereof becomes the corrected regulating amount. As a result, the decompression method can more appropriately regulate the flow rate of the flow regulating valve (14) than in a case where the regulating amount of the flow regulating valve (14) as determined based on the pressure of the compressed gas is not corrected based on the temperature of the compressed gas.

The present invention is not limited to the above disclosure, and various modifications are possible without departing from the essence and gist of the present invention.

What is claimed is:

1. A decompression system that decompresses compressed gas generated by a gas generating device configured to generate the compressed gas, the decompression system comprising:
    a flow regulating valve provided on a discharge flow path through which the compressed gas flowing out from the gas generating device flows, the flow regulating valve being configured to regulate a flow rate of the compressed gas;
    a temperature sensor provided on the discharge flow path and configured to detect a temperature of the compressed gas;
    a pressure sensor provided on the discharge flow path and configured to detect a pressure of the compressed gas;
    an outside air temperature sensor configured to detect an outside air temperature of the gas generating device; and
    a control device configured to control the flow regulating valve, the control device comprising one or more processors that execute computer-executable instructions stored in a memory, wherein
    the one or more processors execute the computer-executable instructions to cause the control device to:
    determine a regulating amount of the flow regulating valve based on the pressure detected by the pressure sensor, and correct the determined regulating amount based on the temperature detected by the temperature sensor,
    measure a change rate of the pressure that is a change in the pressure per unit time, from a start of control of the flow regulating valve; and determine the regulating amount according to the measured change rate,
    vary the regulating amount so as to reduce a difference between the measured change rate and a target change rate,
    estimate a temperature gradient of the compressed gas based on the temperature detected by the temperature sensor at the start of the control of the flow regulating valve and the outside air temperature detected by the outside air temperature sensor at the start of the control of the flow regulating valve, and
    further correct the determined regulating amount based on the estimated temperature gradient.

2. The decompression system according to claim 1, wherein
    the one or more processors cause the control device to correct the determined regulating amount in a manner so that the flow rate decreases as the temperature increases.

3. A decompression system that decompresses compressed gas generated by a gas generating device configured to generate the compressed gas, the decompression system comprising:
- a flow regulating valve provided on a discharge flow path through which the compressed gas flowing out from the gas generating device flows, the flow regulating valve being configured to regulate a flow rate of the compressed gas;
- a temperature sensor provided on the discharge flow path and configured to detect a temperature of the compressed gas;
- a pressure sensor provided on the discharge flow path and configured to detect a pressure of the compressed gas; and
- a control device configured to control the flow regulating valve, the control device comprising one or more processors that execute computer-executable instructions stored in a memory, wherein
- the one or more processors execute the computer-executable instructions to cause the control device to:
- determine a regulating amount of the flow regulating valve based on the pressure detected by the pressure sensor, and correct the determined regulating amount based on the temperature detected by the temperature sensor,
- further correct the determined regulating amount according to the temperature at a start of control of the flow regulating valve, and further
- correct the determined regulating amount according to a number of decompression events wherein performing processing from the start of the control of the flow regulating valve to an end of the control thereof is defined as a decompression event.

4. The decompression system according to claim 3, wherein
the one or more processors cause the control device to correct the determined regulating amount in a manner so that the flow rate decreases as the number of the decompression events increases.

5. The decompression system according to claim 3, wherein
the one or more processors cause the control device to correct the determined regulating amount in a manner so that the flow rate decreases as the temperature increases.

6. A decompression method for decompressing compressed gas generated by a gas generating device configured to generate the compressed gas, the decompression method comprising:
- determining a regulating amount of a flow regulating valve provided on a discharge flow path through which the compressed gas flowing out from the gas generating device flows, the regulating amount being determined based on a pressure detected by a pressure sensor provided on the discharge flow path;
- correcting the determined regulating amount based on a temperature detected by a temperature sensor provided on the discharge flow path;
- measuring a change rate of the pressure that is a change in the pressure per unit time, from a start of control of the flow regulating valve; and determining the regulating amount according to the measured change rate;
- varying the regulating amount so as to reduce a difference between the change rate and a target change rate;
- estimating a temperature gradient of the compressed gas based on the temperature detected by the temperature sensor at the start of the control of the flow regulating valve and an outside air temperature detected by an outside air temperature sensor at the start of the control of the flow regulating valve;
- further correcting the determined regulating amount based on the estimated temperature gradient; and
- controlling the flow regulating valve according to the corrected regulating amount.

\* \* \* \* \*